(12) United States Patent
Stetina et al.

(10) Patent No.: US 10,886,796 B2
(45) Date of Patent: Jan. 5, 2021

(54) STATOR ARRANGEMENT FOR AN AXIAL-FLOW MACHINE

(71) Applicant: Miba Sinter Austria GmbH, Laakirchen (AT)

(72) Inventors: Gerold Stetina, Voecklabruck (AT); Christian Sandner, Gmunden (AT); Thomas Riedl, St. Pantaleon-Erla (AT); Dietmar Andessner, Offenhausen (AT)

(73) Assignee: Miba Sinter Austria GmbH, Laakirchen (AT)

( * ) Notice: Subject to any disclaimer, the term of this patent is extended or adjusted under 35 U.S.C. 154(b) by 51 days.

(21) Appl. No.: 16/223,433

(22) Filed: Dec. 18, 2018

(65) Prior Publication Data

US 2019/0252930 A1 Aug. 15, 2019

(30) Foreign Application Priority Data

Feb. 9, 2018 (AT) .............................. A 50128/2018

(51) Int. Cl.
*H02K 1/18* (2006.01)
*H02K 3/50* (2006.01)
(Continued)

(52) U.S. Cl.
CPC ............. *H02K 1/182* (2013.01); *H02K 1/148* (2013.01); *H02K 3/50* (2013.01); *H02K 3/522* (2013.01); *H02K 21/24* (2013.01)

(58) Field of Classification Search
CPC .......... H02K 1/2793; H02K 1/48; H02K 1/18; H02K 1/182; H02K 3/32; H02K 3/325;
(Continued)

(56) References Cited

U.S. PATENT DOCUMENTS

| 6,445,105 B1* | 9/2002 | Kliman | ................... H02K 1/14 |
| | | | 310/156.35 |
| 2007/0018528 A1* | 1/2007 | Naitou | ................... H02K 1/148 |
| | | | 310/216.016 |

(Continued)

FOREIGN PATENT DOCUMENTS

| DE | 102014211662 A1 * 12/2015 |
| DE | 10 2016 203 140 A1 8/2017 |

(Continued)

OTHER PUBLICATIONS

Haegele et al., Machine Translation of DE102014211662, Dec. 2015 (Year: 2015).*

(Continued)

*Primary Examiner* — Quyen P Leung
*Assistant Examiner* — Eric Johnson
(74) *Attorney, Agent, or Firm* — Collard & Roe, P.C.

(57) ABSTRACT

A stator arrangement for an axial-flow machine includes a stator having stator teeth circumferentially distributed concentrically and axially separated from a rotor by an air gap. The stator teeth have two axially-opposite end portions and a tooth core therebetween. Each tooth core is wound with at least one coil winding. The first end portion facing the rotor forms a tooth tip having a tip cross-sectional area larger than the core cross-sectional area. The second end portion, turned away from the rotor, forms a tooth root, having a root cross-sectional area, which is joined to a reflux plate. The tooth tip of each stator tooth as well as the reflux plate respectively has at least one recess for at least one tooth securing device, and each stator tooth is securely joined by the at least one tooth securing device to the reflex plate in at least axial direction.

12 Claims, 6 Drawing Sheets

(51) Int. Cl.
*H02K 1/14* (2006.01)
*H02K 3/52* (2006.01)
*H02K 21/24* (2006.01)

(58) Field of Classification Search
CPC .. H02K 3/34; H02K 3/46; H02K 3/50; H02K 3/52; H02K 3/521; H02K 3/522; H02K 21/24; H02K 2203/12; H02K 1/148
USPC ......... 310/156.32–156.37, 216.079–216.089, 310/216.098
See application file for complete search history.

(56) References Cited

U.S. PATENT DOCUMENTS

| | | | |
|---|---|---|---|
| 2009/0324435 A1* | 12/2009 | Sears | H02K 3/522 417/423.7 |
| 2015/0229177 A1* | 8/2015 | Langford | H02K 1/146 310/215 |
| 2018/0017116 A1 | 1/2018 | Abt et al. | |
| 2020/0067391 A1 | 2/2020 | Sandner et al. | |

FOREIGN PATENT DOCUMENTS

| | | | |
|---|---|---|---|
| EP | 3 331 140 A1 | | 6/2018 |
| JP | 2002305851 A | * | 10/2002 |
| JP | 2006280052 A | * | 10/2006 |
| JP | 2012105372 A | * | 5/2012 |
| WO | 2010/034082 A1 | | 4/2010 |
| WO | WO-2012014969 A1 | * | 2/2012 |
| WO | WO-2011086021 A2 | * | 7/2012 |
| WO | 2017/178008 A1 | | 10/2017 |

OTHER PUBLICATIONS

Yumoto, Machine Translation of JP2002305851, Oct. 2002 (Year: 2002).*
Inaguma et al., Machine Translation of JP2006280052, Oct. 2006 (Year: 2006).*
Hayakawa et al., Machine Translation of JP2012105372, May 2012 (Year: 2012).*
Nagao et al., Machine Translation of WO2012014969, Feb. 2012 (Year: 2012).*

* cited by examiner

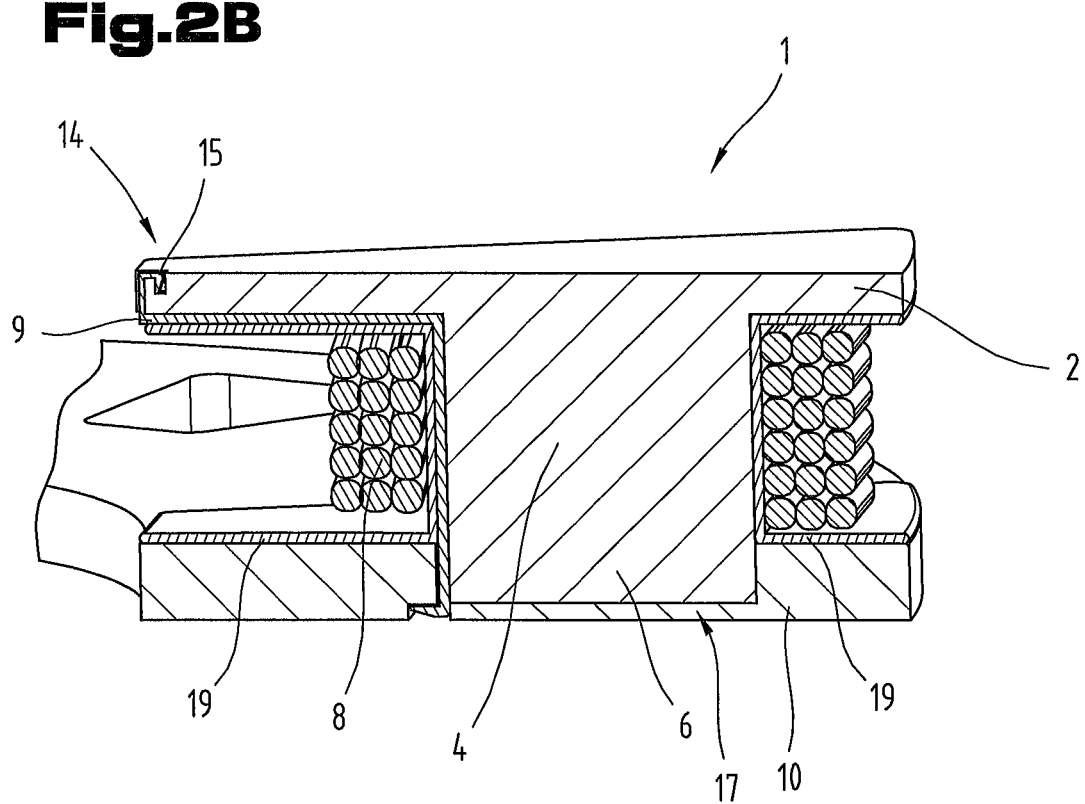
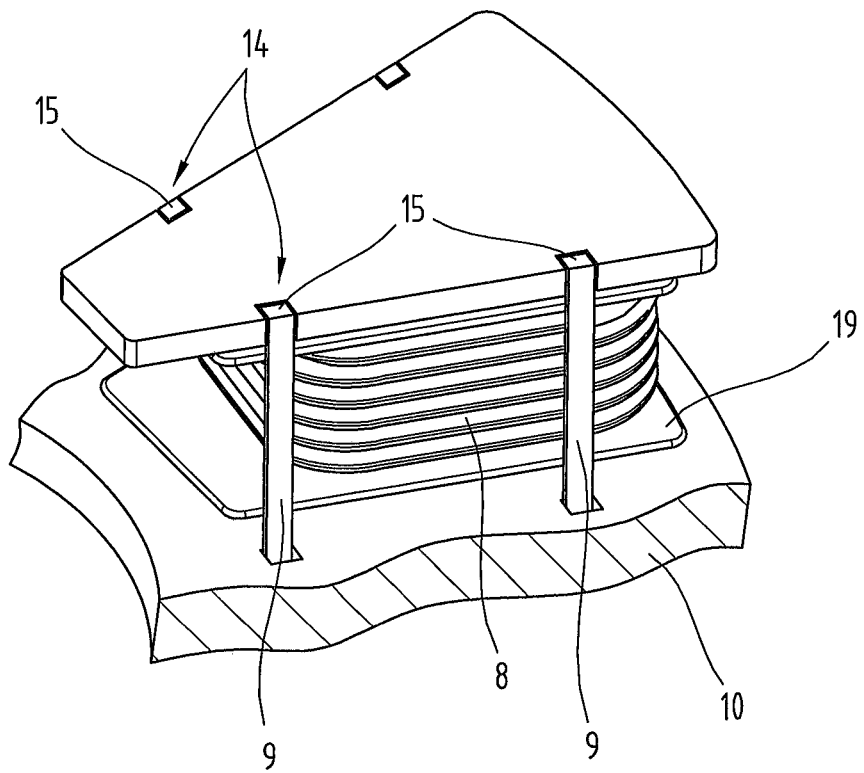

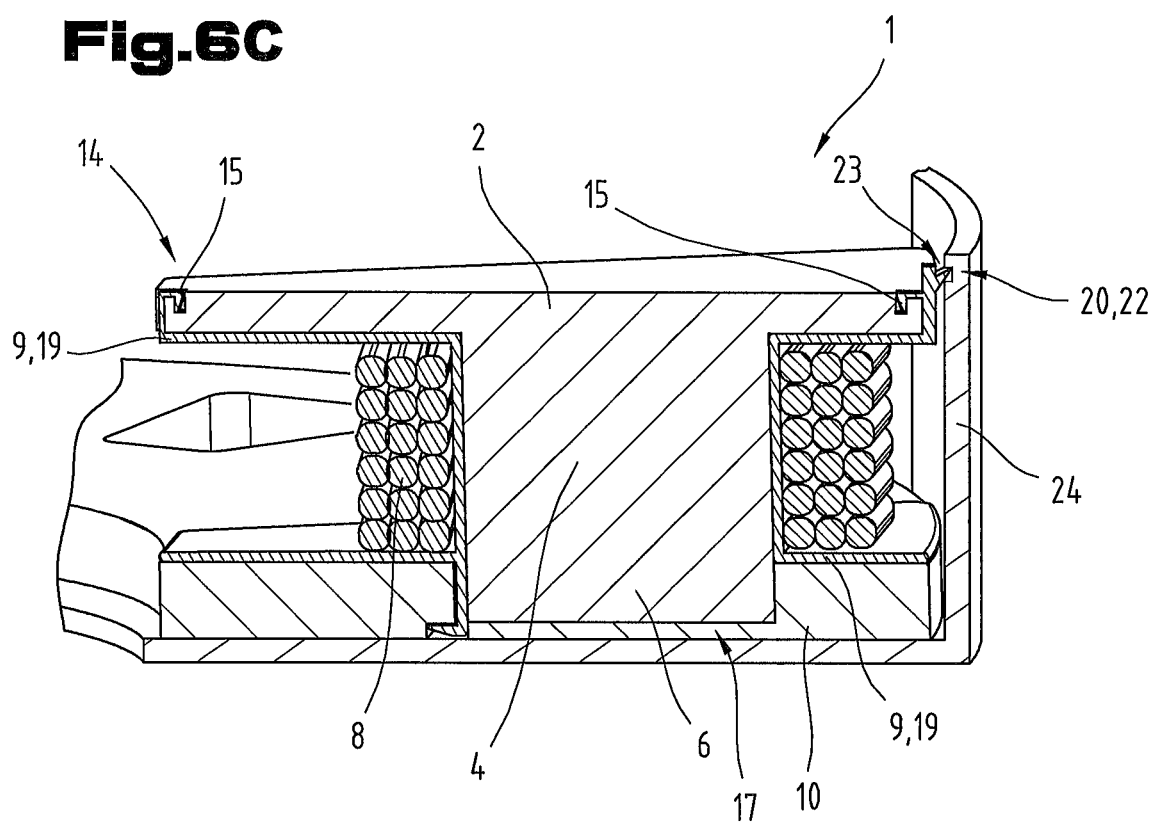

STATOR ARRANGEMENT FOR AN AXIAL-FLOW MACHINE

CROSS REFERENCE TO RELATED APPLICATIONS

Applicant claims priority under 35 U.S.C. § 119 of Austrian Application No. A 50128/2018 filed Feb. 9, 2018, the disclosure of which is incorporated by reference.

BACKGROUND OF THE INVENTION

1. Field of the Invention

The invention relates to a stator arrangement for an axial-flow machine, as well as to an axial-flow machine having such a stator arrangement.

2. Description of the Related Art

Electric machines with disk-like rotor and stator disposed parallel thereto are known from the prior art and find use, for example, in axial-flow machines. Usually, the rotor has a multiplicity of permanent magnets, which rotate past oppositely situated, electromagnetically excitable poles of the stator in a manner separated by an air gap. These electromagnetically excitable poles are formed, for example, as stator teeth from a soft-magnetic material, around the tooth core of which a coil winding induces a magnetic field upon passage of current. By pulsed passage of current of the stator teeth or their coil windings disposed uniformly and concentrically in circumferential direction of the stator, the torque is transmitted to the rotor.

In an axial-flow machine, an axial force then acts on the stator. As proposed in DE 102016203140 A1, the stator teeth may be connected to the housing of the electric machine by means of a clamping element. For this purpose, the clamping element presses the stator foot into an undercut of a depression of the housing and thus fastens the stator tooth on the housing.

Depending on motor configuration and application, very high power and/or torque densities may be required. Furthermore, it may be necessary to connect the stator teeth electrically and/or magnetically to one another via a reflux plate or a magnet yoke on the side turned away from the rotor, in order to achieve an improved magnetic flux density.

For realization of known stator arrangements having a multiplicity of stator teeth having stator windings or coil windings, however, considerable time and/or mechanical complexity is necessary. An improved magnetic flux density of the stator arrangement may achieve an increased efficiency of the axial-flow machine, whereby a relatively smaller overall space requirement can be realized with comparable efficiency of known stator arrangements.

SUMMARY OF THE INVENTION

The task of the present invention was to overcome the disadvantages of the prior art and to provide a stator arrangement by means of which a user is able to undertake a relatively simple and safe mounting of a stator for axial-flow machines.

This task is accomplished by an apparatus, stator arrangement according to the invention, as well as an axial flow machine that comprises a stator arrangement, according to the claims.

The stator arrangement according to the invention for an axial-flow machine comprises a stator having a multiplicity of stator teeth, which stator teeth are distributed concentrically in circumferential direction and are disposed in a manner separated from a rotor in axial direction by an air gap, which stator teeth comprise two end portions situated oppositely in axial direction and a tooth core between the end portions, and wherein each tooth core has a core cross-sectional area and is wound with at least one coil winding, and wherein the first end portion, turned toward the rotor, of each stator tooth is designed as a tooth tip, the tip cross-sectional area is larger than the core cross-sectional area, and wherein the second end portion, turned away from the rotor, of each stator tooth is designed as a tooth root having a root cross-sectional area, which is joined to a reflux plate, and wherein the tooth tip of each stator tooth as well as the reflux plate respectively has at least one recess for at least one tooth securing means, and each stator tooth is joined by way of the at least one tooth securing means to the reflex plate in a manner secured against displacement in at least axial direction.

Herewith the stator arrangement according to the invention permits a securing of the stator teeth in axial direction, whereby axial forces on the stator teeth can be absorbed efficiently. Within the context of the invention, a recess may be a depression such as, for example, a chamfer, an indentation, a notch, a slot and the like, but in the limit case may also be a through opening.

Due to the larger tip cross section of the stator teeth compared with the core cross section, the tooth tip is able to act as a magnetic flux collector. In order to close the magnetic field lines in the reflux plate, the stator teeth should be joined to this. Thus the reflux plate is able to act as a magnet yoke. Thus the magnetic flux density or the distribution of the magnetic field in the presented stator arrangement can be improved compared with stator teeth without stator head. The tooth securing means further offers the advantage that the ratio of the electromagnetically excitable tip cross section to the core cross section of the stator teeth can be increased compared with an arrangement without tooth securing means, since the mechanical load on the tooth core in axial direction decreases significantly compared with a stator arrangement without tooth securing means. By way of the tooth securing means, therefore, reduced core cross sections and conversely an increased number of turns or winding area of the coil winding can be achieved, whereby the efficiency can be increased.

Furthermore, in the presented stator arrangement, stator tooth tip, stator tooth core and/or stator tooth root can be equipped relatively simply with a coil winding, before an assembly together with the stator yoke or the reflux plate takes place. In the process, the coil winding should be separated from the stator tooth and/or the reflux plate by an electrically insulative insulation, for which purpose insulating paper, for example, is commonly used. It is also conceivable that the coil windings can be supplied in prefabricated manner or already on a winding carrier, which is insulating, for example, before an assembly of the stator arrangement takes place. Hereby a relatively simple, step-wise assembly is made possible, which may even be carried out in automated manner. In contrast, a one-piece construction of the stator yoke with stator teeth protruding from it and the said tooth tips would require a complicated winding of the stator cores with the coil windings, and beyond this would have a smaller filling factor.

The reflux plate may be composed of a multiplicity of stator laminations, which are insulated from one another.

The at least one recess of the reflux plate may be constructed in such a way according to the invention that the reflux plate does not have to be passed through completely by the tooth securing means, but instead such that the recess extends only over a part of the stator laminations in axial and/or radial direction. Hereby the stator tooth securing means may indeed be joined to the reflux plate, but the magnetic flux guidance on the side of the reflux plate turned away from the rotor is substantially uninfluenced.

Beyond this, the stator arrangement according to the invention may be joined by means of adhesive joints between tooth tip, tooth core, tooth root and the reflux plate, wherein the tooth securing means achieves a substantial advantage during the process of curing of the adhesive in terms of a protection against displacement. Beyond this, the stator arrangement, by virtue of the tooth securing means, is able to lessen or prevent a displacement or a detachment of the teeth at least in axial direction even in the case of adhesive joints that are defectively constructed or in the limit case even omitted.

Furthermore, it belongs to the inventive idea that the at least one tooth securing means may be designed in such a way as to connect the stator arrangement interlockingly to a housing. This may be done by one or more tooth securing means. This tooth securing means may be designed in such a way that, in addition to the securing of a stator tooth on the reflux plate, it joins the stator arrangement to the housing in axial and/or radial and/or circumferential direction.

It is also conceivable that the stator arrangement comprises at least one tooth securing means that is designed as a fixing means, preferably a screw. In this case, the fixation means is disposed in such a way that it joins the respective stator tooth to the reflux plate and/or a housing by passing through them in axial direction, wherein the at least one recess of the reflux plate may be constructed, for example, as a thread or through opening.

Furthermore, it may be expedient when the tooth tip, the tooth core and the tooth root are constructed in one piece as the stator tooth.

Hereby the above-described mounting of the stator tooth on the reflux plate as well as the merging with a coil winding is significantly simplified. Furthermore, the power density is increased due to the reduced number of boundary faces, such as between the stator components tooth tip and tooth core, for example, or between tooth core and tooth root. In particular, it is of advantage when tooth core and tooth root are constructed in one piece or as one part. In addition, inaccuracies caused by fabrication tolerances of the individual components can be avoided in the case of one-piece construction of the stator tooth, and so the magnetic flux guidance can be optimized.

Furthermore, it may be provided that the stator tooth, consisting of tooth tip, tooth core and tooth root, and/or the reflux plate can be made from a soft-magnetic composite material.

The use of a soft-magnetic composite or composite material (SMC—Soft Magnetic Composite) permits the manufacture of complex structural part geometries with almost magnetically isotropic properties. In this way, the recesses for the tooth securing means do not cause any substantial impairment of the magnetic flux guidance. The use of soft-magnetic composite structural parts, such as the stator teeth and/or the reflux plate, by means of soft-magnetic composite materials usually suffers from the disadvantage that these materials are relatively brittle. Due to the stator arrangement according to the invention, however, it is possible to compensate for this disadvantage by the use of a tooth securing means, whereby the freedom of configuration of the stator-tooth geometry is enhanced and at the same time the attainable power densities can be increased.

Beyond this, it may be provided that the at least one tooth securing means has latching elements, which are formed in a manner complementary in shape and function to the at least one recess of the tooth tip and of the reflux plate.

In the context of this Application, all kinds of prolongations that can be constructed as angled and/or stepped hooks or noses are to be understood as latching elements. The latching elements enter into an interlocking connection with the recesses of the tooth tip or of the reflux plate. By means of the latching elements, the tooth securing means is therefore additionally secured against unintended detachment. Furthermore, due to the use of latching elements at the respective ends that are joined to the stator head or the reflux plate, the recesses corresponding thereto are configured very compactly. A secure engagement and connection of the tooth securing means is made possible with simultaneously low material loss of the stator head or of the reflux plate.

A manifestation is also advantageous in which it may be provided that the at least one recess is disposed on the tooth tip outwardly and/or inwardly in radial direction and/or in circumferential direction.

If the at least one recess is disposed on the tooth tip in a manner starting from outside and extending inwardly in radial direction or starting from inside and extending outwardly in radial direction, an undesired enlargement of the stator diameter outwardly or an undesired reduction of the available stator inside diameter may be avoided by virtue of the tooth securing means. Hereby a compact design of the stator arrangement is made possible, since the tooth securing means engages, as it were, in the stator tooth, instead of securing the stator tooth from the outside. Analogously to this, the at least one recess may be disposed on the tooth tips in circumferential direction on at least one side. The stator teeth are disposed in a manner separated from one another in circumferential direction, whereby the tooth securing means may be disposed between them. Consequently, the recess may be configured on the reflux plate in such a way that the reflux plate does not have to be passed through by the tooth securing means, but merely the receiving of the end of the tooth securing means must be assured in order to fulfill the desired function.

According to a further development, it is possible that the reflux plate has receptacles, which are complementary in shape to the tooth root and the cross-sectional area of which corresponds substantially to the root cross sectional area.

In the stator arrangement according to the invention, the stator teeth may therefore be received at least partly by the reflux plate. This permits an additional securing and thus increased loadability of the stator teeth against displacement in radial and/or circumferential direction. In this case, the receptacles of the reflux plate do not pass completely through it in axial direction. In other words, it is possible, for example, to provide one or more stator laminations of the reflux plate or even, for example, a residual wall thickness in a reflux plate, of soft-magnetic composite material. In this way a relatively inexpensive and efficient limitation of the stator teeth in axial, radial and/or circumferential direction may be formed. In addition, a good magnetization of the stator teeth or of the reflux plate may be achieved.

Furthermore, it may be expedient when at least one stator tooth is additionally secured at its tooth root to the reflux plate via an adhesive joint.

The adhesive joint of the tooth root may be formed at least in axial direction over at least parts of the root cross-sectional area. Alternatively, or in combination with this, the adhesive joint may be formed over at least parts of the shell surface in radial and/or circumferential direction of the tooth root. For this purpose, it is advantageous when the reflux plate has receptacles corresponding to the tooth-root geometry. The safety during operation is significantly improved by this feature.

Furthermore, it may be expedient when the tooth securing means is designed such that the stator tooth can be connected to the reflux plate without play by exertion of a preload force.

Because of the exertion of a preload force, the stator tooth is held in its position in axial, circumferential and radial direction, in which it is pressed against the reflux plate. Hereby an optional adhesive joint of the stator tooth on the reflux plate can be secured during the curing process, whereby the quality of the stator arrangement is favored. As materials for the tooth securing means, not only nonconducting plastics but also composite materials are conceivable, such as, for example, a nonmagnetic metal spring, which is sheathed by an electrically nonconducting plastic. By the use of such a material composite, the preload force may even be increased compared with a tooth securing means of plastic.

Beyond this, it may be provided that the tooth securing means is formed in the shape of a bracket and is disposed on at least one side of the stator tooth in a manner extending between stator tooth and coil winding.

In this context, the bracket shape of the tooth securing means is to be understood to the effect that the tooth securing means is formed in a manner extending from the tooth tip inwardly on the tooth core and accordingly has several segments, which may be angled relative to one another. In this connection, the reflux plate is joined to the end of the tooth securing means turned away from the rotor. Thus the tooth securing means may be formed in a manner running from the tooth tip along the shell surface of the tooth core to the reflux plate, thus making it possible for the tooth securing means, viewed from outside, to be disposed within the coil winding or between an optional insulation of the coil winding and the stator tooth. Hereby a very compact stator arrangement design can be realized without parts projecting outwardly or inwardly in radial direction.

Furthermore, it can be provided that the tooth securing means is formed as an electrically insulating winding carrier between coil winding and the tooth root and/or the tooth tip and/or the reflux plate.

By the construction of the tooth securing means as a combination with the electrically insulative insulation as an electrically insulating winding carrier, the assembly of the stator arrangement can be achieved relatively simply. Hereby a complex configuration of the insulation by means of insulating paper can be avoided. The electrically insulating winding carrier may have one or more latching elements, which are able to engage on the tooth tip and/or the reflux plate in the above-mentioned manner, and it is therefore formed in one piece as the tooth securing means. The winding of the combination, according to the invention, of tooth securing means and winding carrier may take place already before the joining of the stator teeth together with the reflux plate, whereby a time advantage is achieved during manufacture. Beyond this, an automated fabrication is conceivable in this way.

According to a particular manifestation, it is possible to design the tooth securing means as an electrically insulating winding carrier in the form of a plastic injection-molded part surrounding at least parts of the tooth core.

It is likewise conceivable that the electrically insulating winding carrier is applied as the tooth securing means around the stator tooth by an upstream injection-molding process. For this purpose, the stator teeth are disposed in a plastic injection-molding machine and overmolded with a preferably thermoplastic plastic at least in the region of the underside of the tooth tip and at least parts of the periphery of the tooth core. For this purpose, the at least one recess of the tooth tip may be formed in such a way that the injected plastic fills these recesses at least partly, whereby a substance-to-substance and/or interlocking connection of the winding carrier on the tooth tip can be established. For this purpose, the at least one recess may also be formed in a manner extending circumferentially around the tooth tip, whereby the connecting area between tooth securing means and tooth tip is increased.

Corresponding to an advantageous further development, it may be provided that the tooth securing means is constructed in the form of annular segments in circumferential direction in such a way that at least two stator teeth together can be joined to the reflux plate.

In this way, at least two stator teeth at the same time can be joined to the reflux plate relatively simply by way of one tooth securing means. The annular-segment form of the tooth securing means is therefore applicable for tooth securing means attached inwardly and/or outwardly in radial direction. Likewise the working effort can be reduced, due to the relatively simple, simultaneous mounting of several stator teeth.

In particular, it may be advantageous when the tooth securing means is constructed in closed manner in circumferential direction, so that all stator teeth together can be joined to the reflux plate.

It is therefore conceivable that, by way of a closed annularly shaped tooth securing means, all stator teeth can be joined to the reflux plate. By analogy with the construction of the tooth securing means in the form of annular segments, this form of the tooth securing means may be disposed inwardly and/or outwardly in radial direction in order to secure the stator teeth. Hereby a reduced mounting time and increased safety can be achieved.

Furthermore, it may be provided that the at least one tooth securing means has latching element formed oppositely in circumferential direction and that it is disposed in circumferential direction between two neighboring stator teeth.

The latching elements may be formed as prolongations of the tooth securing means, in a manner complementary in shape and function to the at least one recess of the tooth tip. Hereby stator teeth disposed adjacently in circumferential direction may be fastened by way of a tooth securing means respectively on at least one side. Thus the mounting of the multiplicity of stator teeth on the reflux plate is significantly simplified.

A manifestation is also advantageous in which it may be provided that the at least one tooth securing means is designed in such a way that the stator arrangement can be connected interlockingly with the housing, preferably in coupling manner.

The formation of one or more tooth securing means, which has at least one latching element which is associated with a retaining means of the housing therefore is referred to as housing latching means. This housing latching element, which is associated with the retaining means of the housing, by analogy with the above-mentioned latching elements associated with a recess of the stator tooth, is formed in a manner complementary to this in shape and function. The retaining means of the housing may be designed, for example, in the form of a housing recess or a retaining means, in order to receive the at least one housing latching element, whereby the stator arrangement may be connected interlockingly with a housing. This connection may be designed to be preferably detachable, i.e. couplable. The advantage of this manifestation lies in the fact that, in addition to the securing of a stator tooth on the reflux plate, the stator arrangement is secured in axial and/or radial and/or circumferential direction within the housing. The at least one housing latching element may also be manifested on a tooth securing means, which is designed as an electrically insulating winding carrier and already has one or more latching elements. The respective latching elements or housing latching elements are therefore able to engage in the above-mentioned way on the tooth tip and/or on the reflux plate, or respectively on the housing. This permits a very comfortable, inexpensive mounting of the stator arrangement in the housing. Due to the preferably detachable connection, the stator arrangement can be separated relatively easily from the housing in the case of a repair. Moreover, due to the connection or coupling of the stator arrangement on the housing, an effective protection against unwanted twisting, tilting and/or lifting of the stator arrangement within the housing can be assured. This increases the stability during the operation, especially when the axial-flow machine into which the stator arrangement is built is in motion.

Thus an axial-flow machine is also presented that comprises a housing and at least one stator as well as at least one rotor, wherein the stator has a stator arrangement according to the invention having at least one of the above-mentioned embodiments. The at least one rotor may be designed as a disk-shaped rotor, which is constructed with a multiplicity of permanent magnets disposed in circumferential direction and separated by an air gap from the stator teeth of the stator in axial direction, and is set in rotation upon passage of current through the coil windings.

For all above-mentioned embodiments, it is also conceivable that the stator arrangement is formed substantially symmetrically in axial direction, whereby the use of two rotors disposed on both sides of the stator arrangement in axial direction is made possible. This stator arrangement of the stator is joined or detachably connected to the housing.

BRIEF DESCRIPTION OF THE DRAWINGS

For better understanding of the invention, it will be explained in more detail on the basis of the following figures.

Therein, respectively in greatly simplified schematic diagrams:

FIG. 2B shows a sectional diagram through a partial portion of an exemplary stator arrangement having inwardly disposed tooth securing means;

FIG. 2C shows a sectional diagram through a partial portion of an exemplary stator arrangement having tooth securing means disposed in distributed manner in circumferential and radial direction;

FIG. 6C shows a sectional diagram through a partial portion of an exemplary stator arrangement having inwardly disposed tooth securing means and housing latching element.

DETAILED DESCRIPTION OF PREFERRED EMBODIMENTS

By way of introduction, it is pointed out that like parts in the differently described embodiments are denoted with like reference symbols or like structural part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

Figure 1:
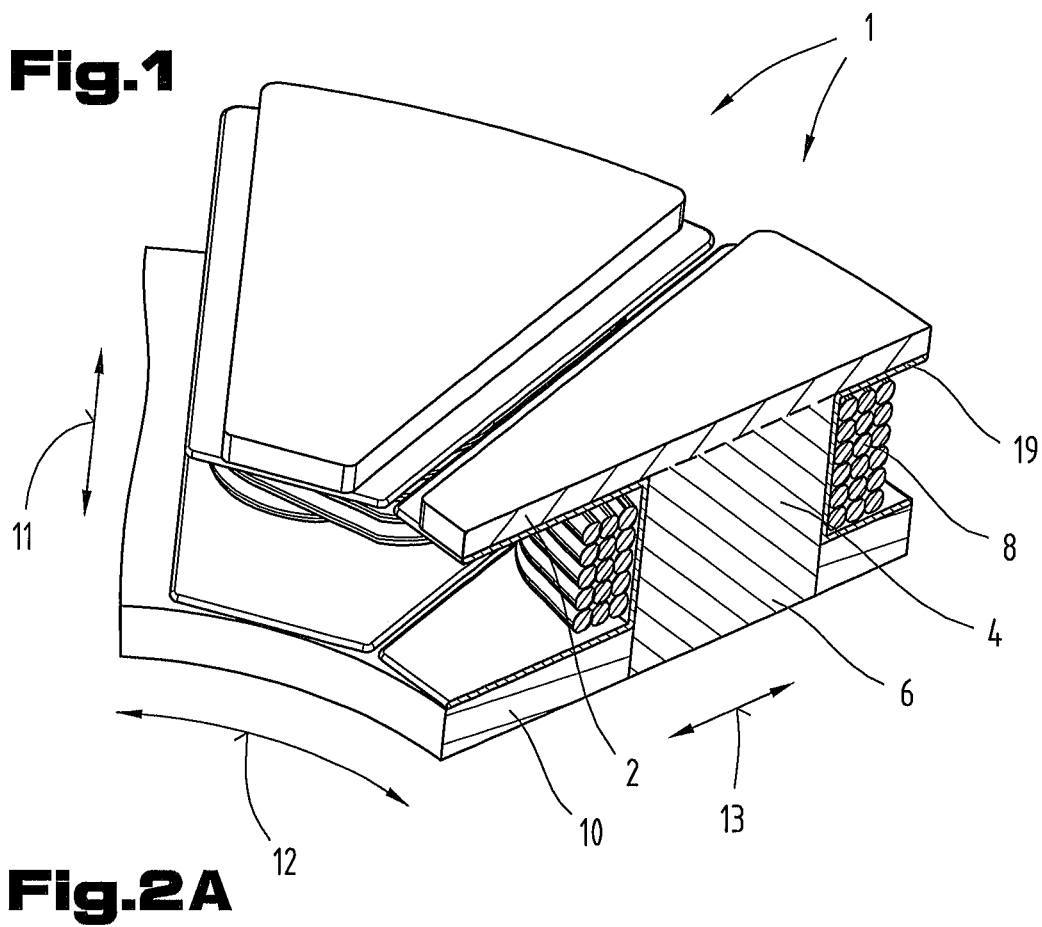
FIG. 1 shows a sectional diagram through a partial portion of an exemplary stator arrangement.

In FIG. 1, a sectional diagram is shown through a partial portion of an exemplary stator arrangement. The stator teeth 1 illustrated here have end portions situated oppositely in axial direction 11, i.e. one tooth tip 2 and one tooth root 6, between which a tooth core 4 extends that is wound with a coil winding 8.

At its root cross-sectional area 7, the tooth root 6 rests in axial direction 11 on the reflux plate 10. In the chosen illustration, the tooth root 6 is formed in one piece with the tooth core 4 and with the reflux plate 10, and is also joined to the tooth tip 2 via an adhesive joint, not illustrated, at the boundary faces. Furthermore, an insulation 19 that extends at least between the coil winding 8 and the tooth core 4 or the tooth tip 2 and the reflux plate 10 is visible in the sectional drawing.

Figure 2A:
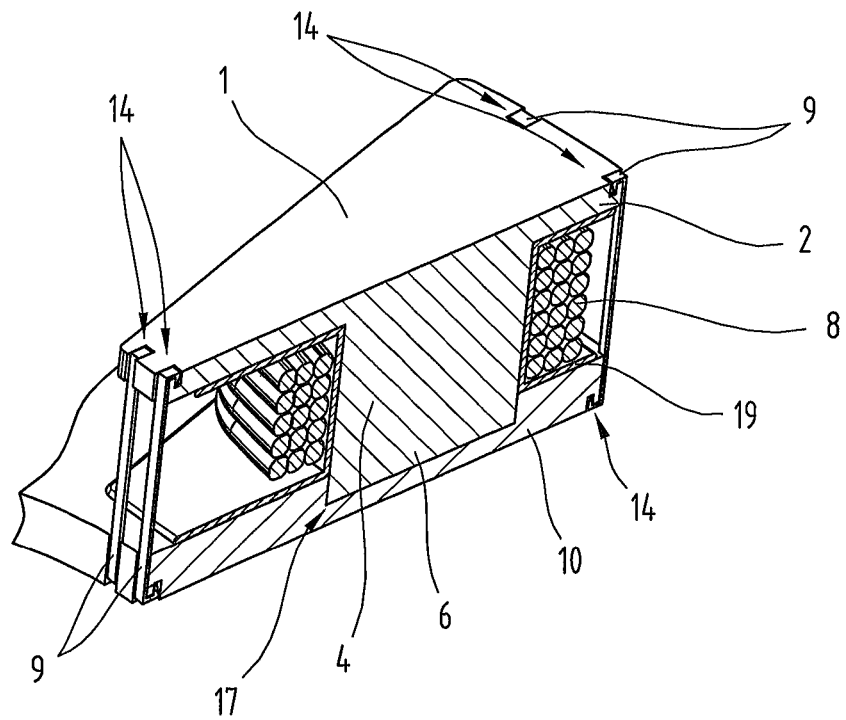
FIG. 2A shows a sectional diagram through a partial portion of an exemplary stator arrangement having tooth securing means disposed radially inward or outward.

FIG. 2A to FIG. 2C illustrate some exemplary embodiments of stator arrangements having tooth securing means 9. The stator core 1 is formed in one piece in the shown examples, meaning that the tooth tip 2, the tooth core 4 and the tooth root 6 are fabricated from one piece. This may be implemented preferably by the manufacture by means of soft-magnetic composite material. In FIG. 2A to FIG. 2C, FIG. 3 and FIG. 4, receptacles 17, which are formed in shape and size substantially complementary to the tooth root 6 or the root cross-sectional area 7, are visible in the reflux plate 10 for the tooth root 6.

In FIG. 2A, it is shown in the sectional diagram that two tooth securing means 9 engage inwardly in radial direction and two tooth securing means 9 engage outwardly in radial direction on the tooth tip 2 in recesses 14 provided for the purpose. These tooth securing means 9 join the stator tooth 1 to the reflux plate 10, which likewise has recesses 14 provided for the tooth securing means 9. The arrangement of the insulation 19, which is disposed between the coil winding 8 and the stator tooth 1 or the reflux plate 10, is further visible. The tooth securing means 9 may also be advantageously formed in one piece with the insulation 19 as an electrical winding carrier 16, as is illustrated by way of example in FIG. 3 and FIG. 6C.

In FIG. 2B, an exemplary embodiment is illustrated in which a tooth securing means 9 for connection of the stator tooth 1 to the reflux plate 10 engages inwardly in radial direction 13 on the tooth tip 2, as well as in the reflux plate 10, in the recesses 14 provided respectively for the purpose. In this way, the stator tooth 1 formed in one piece is pressed by the tooth securing means 9 formed in bracket shape against or into the reflux plate 10. The coil winding 8 is disposed in a manner separated by an insulation 19 from the tooth securing means 9 or the stator tooth 1.

In FIG. 2C, an exemplary embodiment is illustrated in which respectively two tooth securing means 9 for connection of the stator tooth 1 to the reflux plate 10 are disposed laterally in circumferential direction 12 on the tooth tip 2. The second ends of this tooth securing means 9 engage in the reflux plate 10 in recesses 14 provided for the purpose.

The examples of the tooth securing means 9 shown in FIGS. 2A to 2C, FIG. 3 to FIG. 5 may respectively have, at the ends of the tooth securing means 9, latching elements 15, which engage in the recesses 14 provided for the purpose on the tooth tip 2 or reflux plate 10. The configuration of these latching elements 15 or their corresponding recesses 14 may be constructed, for example, as a snap-in connection. For the sake of clarity, however, the latching elements 15 are not shown in all diagrams. Beyond this, it can be seen in the cited diagrams that the recesses 14 may be formed in a manner extending inwardly or outwardly in radial direction 13, in order to be able to receive the tooth securing means 9 in such a way that the tooth securing means 9 do not protrude relative to the inside or outside diameter of the stator arrangement.

Figure 3:
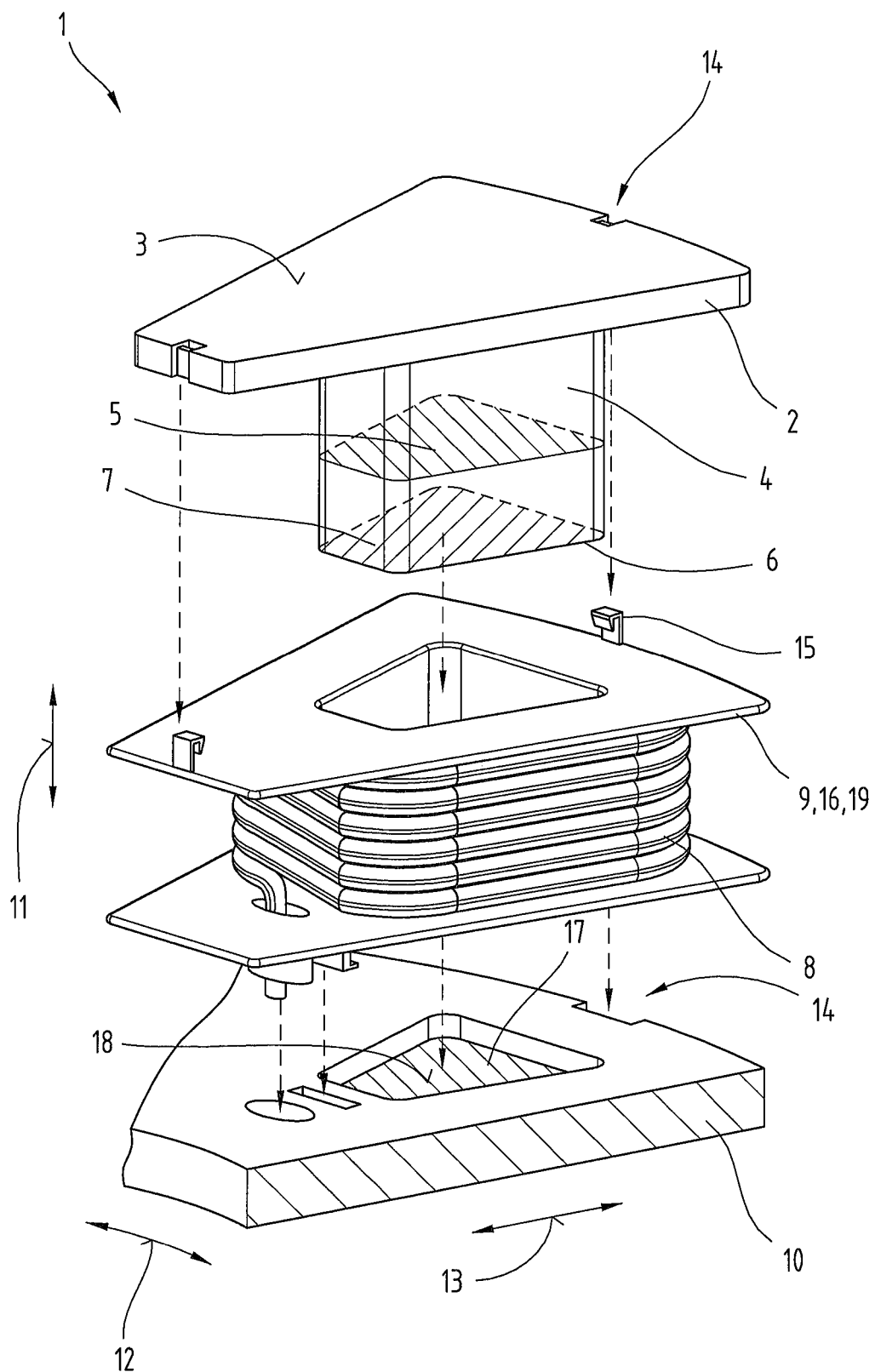
FIG. 3 shows an exploded diagram of an exemplary embodiment having tooth securing means formed as the winding carrier.

In FIG. 3, several exemplary embodiments according to the invention are illustrated. In the chosen exploded diagram, it may be seen that the tooth tip 2 has at least one recess 14, in the specific case two recesses 14 disposed oppositely in radial direction, for the at least one tooth securing means 9. Furthermore, the respective cross sections at various portions of the stator tooth 1 or respectively the tip cross-sectional area 3, the core cross-sectional area 5 as well as the root cross-sectional area 7 are very clearly visible in this diagram. Likewise it may be seen in FIG. 3 that the electrically insulating winding carrier 16, which electrically insulates the coil winding 8 relative to the stator tooth 1 and the reflux plate 10, is formed as the tooth securing means 9. For this purpose, the winding carrier 16 or the tooth securing means 9 has latching elements 15 corresponding to the above-mentioned recesses 14 of the tooth tip 2 or reflux plate 10. The number of tooth securing means 9, latching elements 15 or recesses 14, as well as their arrangement in radial direction 13 and/or circumferential direction 12, may be chosen in almost any desired way by the person skilled in the art. It is decisive for the subject invention that the tooth securing means 9, by connecting with the reflux plate 10 and/or a housing, not illustrated, prevents a displacement of the stator tooth 1 in axial direction 11.

Beyond this, a terminal end of the coil winding, which may be guided in a manner insulated by the winding member into or passing through the reflux plate 10, is shown in FIG. 3. Furthermore, it may be seen from FIG. 3 that the reflux plate 10 has, corresponding to the number of stator teeth 1, receptacles 17, which do not have to be formed in a manner passing through in axial direction 11. For better illustration, the receptacle 17 having the receptacle cross-sectional area 18 is illustrated in shaded manner. The receptacles 17 are used to receive the tooth root 6 at least partly and thus to secure the stator tooth 1 additionally against displacement in radial direction 13 and/or circumferential direction 12.

From the exploded diagram in FIG. 3, the person skilled in the art recognizes the advantage of the subject invention, namely that the winding carrier 16 formed as the tooth securing means 9 has already been wound with the coil winding 8 prior to the mounting of the stator or of the stator arrangement. Thereby the mounting may take place relatively simply in the manner shown by plugging together of the stator tooth 1 having the electrically insulating winding carrier 16 or of the tooth securing means 9 formed as such or of the insulation 19 formed as such, after which a fixation of the stator tooth 1 on the reflux plate 10 may take place.

Likewise it may be easily seen from FIG. 3 that the electrically insulating winding carrier 16 may be formed as a plastic injection-molded part, which surrounds at least parts of the tooth core 4. It may therefore be of advantage when the stator tooth 1 is directly overmolded in an injection-molding process at least the recesses 14 provided for the tooth securing means 9 on the tooth tip 2 as well as at least parts of the tooth core 4 in such a way. This should take place in such a way that the schematically illustrated shape of an insulating winding carrier 16 is created with latching elements 15 projecting at least on one side in the direction of the reflux plate 10. By analogy with the above description, a relatively simple winding of the grouping comprising winding carrier 16 and stator tooth 1 can be achieved hereby with the coil winding 8, and this grouping, which simultaneously acts as tooth securing means 9, can be joined to the reflux plate 10.

As illustrated in FIGS. 2A to 2C and FIG. 3 to FIG. 5, the at least one tooth securing means 9 can be constructed in a manner engaging inwardly and/or outwardly in radial direction 13 or in circumferential direction 12 on the tooth tip 2 and/or the reflux plate 10. For this purpose, the respective corresponding at least one recess 14 is disposed on the tooth tip 2 outwardly and/or inwardly in radial direction 13 and/or in circumferential direction 12.

Furthermore, the stator tooth 1 can be additionally secured, at least at its tooth root 6, to the reflux plate 10 via an adhesive joint. A separate diagram of the adhesive joint is not provided for this purpose, since the construction of such a joint should be sufficiently known to the person skilled in the art.

Furthermore, the tooth securing means 9 illustrated in FIGS. 2A to 2C and FIG. 3 to FIG. 5 may be capable of being joined to the reflux plate 10 by exertion of a preload force, whereby a possible play between tooth root 6 and reflux plate 10 is efficiently avoided. Furthermore, the tooth securing means 9 may preferably be disposed symmetrically, outwardly and/or inwardly in radial direction 13, and/or in circumferential direction 12.

Figure 4:
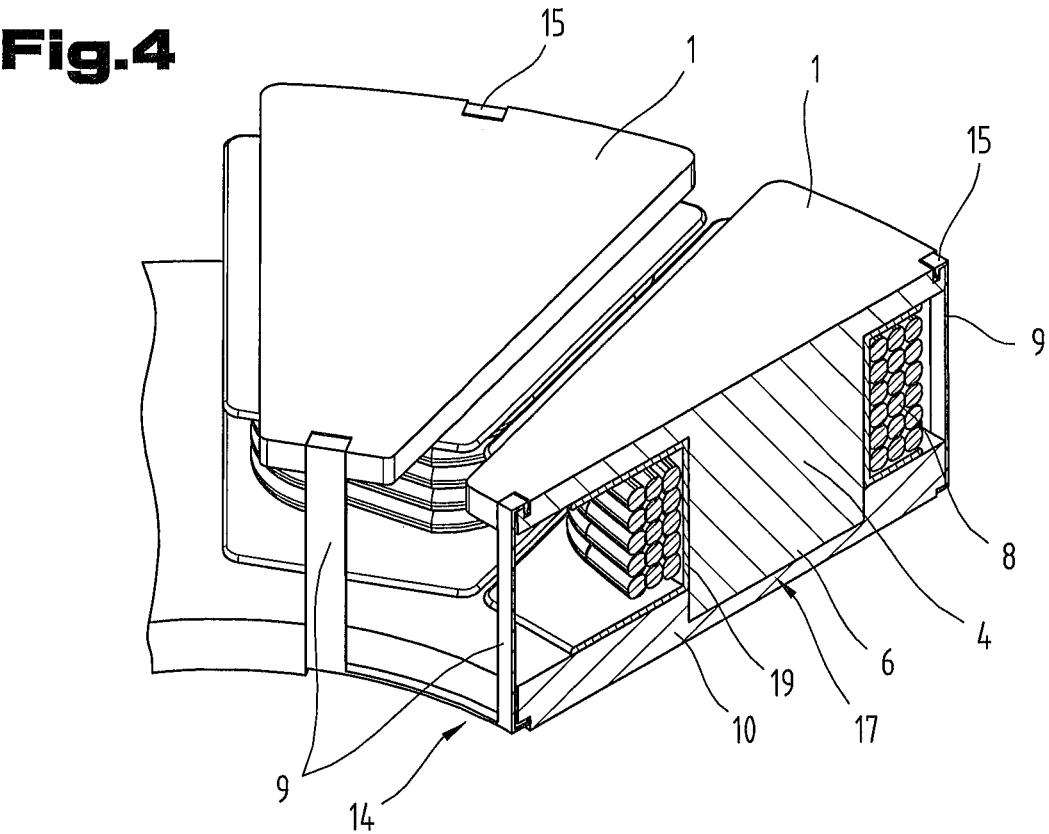
FIG. 4 shows a sectional diagram of an exemplary embodiment having tooth securing means formed in the manner of annular segments.

In FIG. 4, an exemplary diagram is shown of a section through an embodiment, in which tooth securing means 9 in the shape of annular segments are respectively disposed inwardly and outwardly in radial direction 13. In this way, two stator teeth 1 together are joined to the reflux plate 10 in the chosen diagram. In this way, several stator teeth 1 together may also be joined to the reflux plate 10. In the limit case, the at least one tooth securing means 9 is constructed in closed manner in circumferential direction 12 and thus joins all stator teeth 1 to the reflux plate 10.

Figure 5:
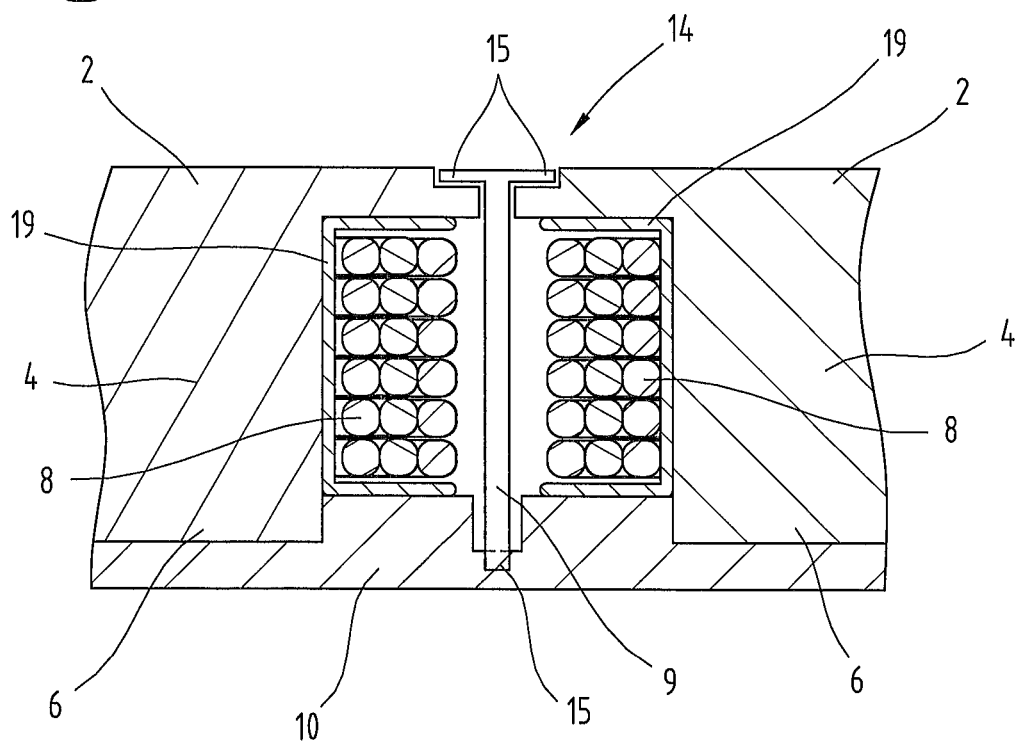
FIG. 5 shows a sectional diagram of an exemplary embodiment having tooth securing means formed on both sides in circumferential direction.

FIG. 5 schematically represents an exemplary embodiment according to the invention, wherein at least one tooth securing means 9 has latching elements 15 formed oppositely in circumferential direction 12 and is disposed in circumferential direction 12 between two neighboring stator teeth 1. In this way, the tooth securing means 9 presses two neighboring tooth tips 2 or the stator teeth 1 at the same time against the reflux plate 10. As is evident particularly clearly from this diagram, the tooth securing means 9 is designed in such a way that only the latching element 15 that is not constructed to pass through in axial direction 11 engages in the corresponding recess 14 of the reflux plate 10.

Figure 6A:
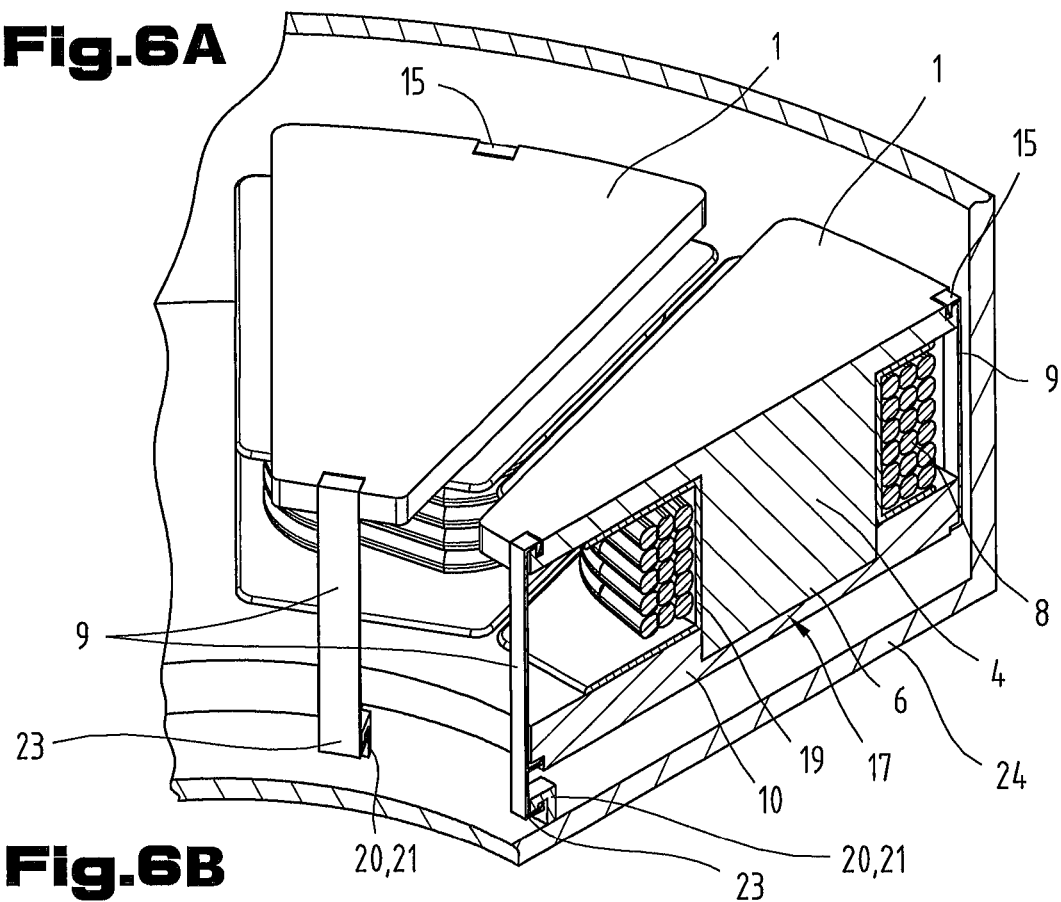
FIG. 6A shows a sectional diagram through a partial portion of an exemplary stator arrangement having tooth securing means, disposed radially inward or outward, having additional housing latching element.
Figure 6B:
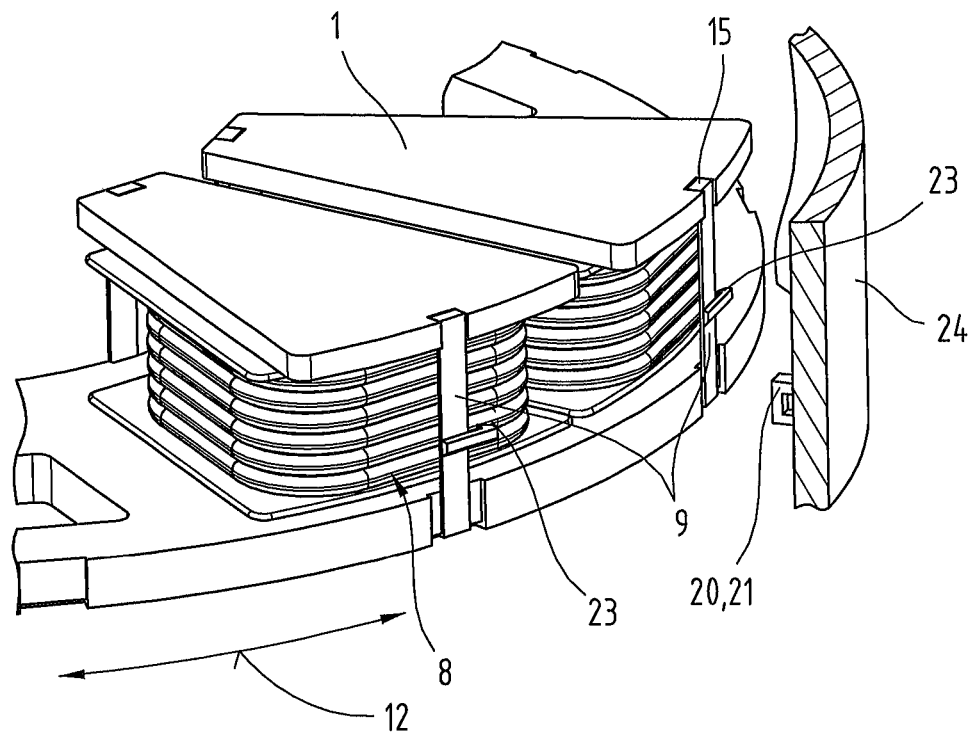
FIG. 6B shows a sectional diagram through a partial portion of an exemplary stator arrangement having outwardly disposed tooth securing means and housing latching element.

Some exemplary embodiments of tooth securing means 9 are shown in FIGS. 6A to 6C, wherein at least the tooth securing means 9 have at least one housing latching element 23, which is associated with a retaining means 20 of the housing 24. This housing latching element 23 may be designed by analogy with the above-mentioned exemplary embodiments of FIG. 2A to FIG. 2C, FIG. 3 to FIG. 5. For implementation of the invention, it may be sufficient that only one tooth securing means 9 has at least one such housing latching element 23. Preferably, however, several tooth securing means 9 respectively have at least one housing latching element 23. As illustrated in FIG. 6A to FIG. 6C, tooth securing means 9 having a combination of latching elements 15 and housing latching elements 23 are possible. The housing latching elements 23 may be disposed inwardly and/or outwardly and/or intermediately on the stator teeth 1 and be coupled to the housing 24 in axial direction 11 and/or radial direction 13 and/or circumferential direction 12.

In FIG. 6A, an exemplary embodiment is shown as inwardly situated tooth securing means 9, which have radially outwardly directed housing latching elements 23 and are designed to be complementary in shape and function to a retaining means 20 of the housing 24. In the chosen diagram, the retaining means 20 is formed as a bow-shaped retainer 21 in order to receive the at least one housing latching element 23. Thus the stator arrangement is connected interlockingly in axial direction 11 with the bottom of the housing.

A further possible embodiment of a tooth securing means 9 is illustrated in FIG. 6B, wherein the tooth securing means 9 is constructed in the form of annular segments in circumferential direction 12 in such a way that at least two stator teeth 1 together can be joined to the reflux plate 10 and wherein it has two outwardly directed housing latching elements 23. For simplification of the diagram, only a section of the stator arrangement is shown, and the tooth securing means 9, which has the housing latching elements 23, is illustrated spaced apart from the associated retaining means 20. By means of a twisting movement, the stator arrangement can be connected at least temporarily by the snapping-in of the housing latching elements 23 of the tooth securing means 9 into the retainers 21 of the housing 24. Due to the formation of the retaining means 20 on the inside face of the housing 24, the housing latching elements 23 may be detached from above in the case of a repair, whereby the stator arrangement can be detached from the housing once again.

In FIG. 6C, a further possible embodiment of a stator arrangement is shown, wherein the tooth securing means 9 is formed in the shape of a bracket as an insulating winding carrier 16 and is disposed in a manner extending between stator tooth 1 and coil winding 8. In addition to latching elements 15, which are associated with the stator tooth 1 or the reflux plate 10, the tooth securing means 9 has outwardly directed housing latching elements 23, which are formed to be complementary in shape and function to a housing recess 22. By the introduction of the stator arrangement into a housing 24, a coupling is achieved relatively simply. Furthermore, due to the formation as an insulating winding carrier 16, on which the latching elements 15 or housing latching elements 23 are disposed, the passing through of the housing 24 is avoided. This advantage is also applicable for the embodiments mentioned in the foregoing.

Accordingly, the stator arrangement according to the invention may comprise tooth securing means 9 that permit securing of the stator teeth 1 and at the same time a protection against twisting, tilting and/or lifting of the stator arrangement obtained in this way in axial direction 11, radial direction 13 and circumferential direction 12. The cited examples of the stator arrangements in the description of FIG. 2A to FIG. 5 can be constructed individually or in combination with the formation of at least one tooth securing means 9 having at least one housing latching element 23, whereby the stator arrangement may be connected interlockingly with a housing 24. This connection may be designed to be preferably detachable.

The exemplary embodiments show possible embodiment variants, wherein it must be noted at this place that the invention is not restricted to the specially illustrated embodiment variants of the same, but instead diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some elements have been illustrated not to scale and/or enlarged and/or reduced for better understanding of the structure.

Although only a few embodiments of the present invention have been shown and described, it is to be understood that many changes and modifications may be made thereunto without departing from the spirit and scope of the invention.

LIST OF REFERENCE SYMBOLS

1 Stator tooth/teeth
2 Tooth tip
3 Tip cross-sectional area
4 Tooth core
5 Core cross-sectional area
6 Tooth root
7 Root cross-sectional area
8 Coil winding
9 Tooth securing means
10 Reflux plate 11 Axial direction
12 Circumferential direction
13 Radial direction
14 Recess
15 Latching elements
16 Winding carrier
17 Receptacle
18 Receptacle cross-sectional area
19 Insulation
20 Retaining means
21 Retainer
22 Housing recess
23 Housing latching element
24 Housing

What is claimed is:

1. A stator arrangement for an axial-flow machine, comprising a stator with a multiplicity of stator teeth (1),
   which stator teeth (1) are distributed concentrically in circumferential direction (12) and are disposed in a manner separated from a rotor by an air gap in axial direction (11),
   which stator teeth (1) comprise two end portions situated oppositely in axial direction (11) and a tooth core (4) between the end portions,
   and wherein each tooth core (4) has a cross-sectional area (5) and is wound with at least one coil winding (8), and wherein the first end portion, turned toward the rotor, of each stator tooth (1) is formed as the tooth tip (2), the tip cross-sectional area (3) of which is larger than the core cross-sectional area (5),
   and wherein the second end portion, turned away from the rotor, of each stator tooth (1) is designed as a tooth root (6) having a root cross-sectional area (7), which is joined to a reflux plate (10),
   wherein:
   the tooth tip (2) of each stator tooth (1) as well as the reflux plate (10) respectively has at least one recess (14) for at least one tooth securing means (9),
   the at least one recess (14) is disposed on the tooth tip (2) outwardly and/or inwardly in radial direction (13) and/or in circumferential direction (12),
   each stator tooth (1) is joined securely to the reflux plate (10) in at least axial direction by means of the at least one tooth securing means (9), and
   the tooth securing means (9) is formed in the shape of a bracket and is disposed on at least one side of the stator tooth (1) in a manner extending between stator tooth (1) and coil winding (8).

2. The stator arrangement according to claim 1, wherein the tooth tip (2), the tooth core (4) and the tooth root (6) are constructed in one piece as the stator tooth (1).

3. The stator arrangement according to claim 1, wherein the stator tooth (1), comprising the tooth tip (2), the tooth core (4) and the tooth root (6) and/or the reflux plate (10) are made from a soft-magnetic composite material.

4. The stator arrangement according to claim 1, wherein the at least one tooth securing means (9) has latching elements (15), which are formed in a manner complementary in shape and/or function to the at least one recess (14) of the tooth tip (2) and of the reflux plate (10).

5. The stator arrangement according to claim 1, wherein the reflux plate (10) has receptacles (17) complementary in shape to the tooth root (6), the receptacle cross-sectional area (18) of which corresponds substantially to the root cross sectional area (7).

6. The stator arrangement according to claim 1, wherein the at least one stator tooth (1) is additionally secured at its tooth root (6) to the reflux plate (10) via an adhesive joint.

7. The stator arrangement according to claim 1, wherein the at least one tooth securing means (9) is designed such that the stator tooth (1) can be connected to the reflux plate (10) without play by exertion of a preload force.

8. The stator arrangement according to claim 1, wherein the tooth securing means (9) is formed as an electrically insulating winding carrier (16).

9. The stator arrangement according to claim 8, wherein the tooth securing means (9) is designed as an electrically insulating winding carrier (16) in the form of a plastic injection-molded part surrounding at least parts of the tooth core (4).

10. The stator arrangement according to claim 1, wherein the at least one tooth securing means (9) is designed in such a way that the stator arrangement can be connected interlockingly with a housing (24).

11. An axial-flow machine, comprising a housing (24), a stator and at least one rotor, wherein the stator has a stator arrangement according to claim 1, and wherein the stator arrangement of the stator exists in a manner joined to the housing (24).

12. The axial-flow machine according to claim 11, wherein the housing (24) has at least one retaining means (20).

* * * * *